Oct. 10, 1939.   E. A. HAUSER   2,175,798
MANUFACTURE OF POROUS RUBBER
Filed July 22, 1936

Inventor:
Ernst A. Hauser
By Theodore C. Browne
Attorney.

Patented Oct. 10, 1939

2,175,798

UNITED STATES PATENT OFFICE 2,175,798

MANUFACTURE OF POROUS RUBBER

Ernst A. Hauser, Cambridge, Mass., assignor to Dewey and Almy Chemical Company, North Cambridge, Mass., a corporation of Massachusetts Application July 22, 1936, Serial No. 91,900

10 Claims. (Cl. 18—53)

This invention relates to the manufacture of porous articles from rubber and is particularly directed towards the manufacture of battery separators and porous filtering media.

The object of my invention is to achieve uniform, controllable porosity in rubber masses generally and, although I shall describe the process as applied to the manufacture of permeable membranes (sometimes called micro-porous) such as dialyzing membranes, battery separators and filter sheets, my invention is by no means limited to such products. Minor changes in compounding, sulphur content, and handling familiar to all technicians adapt my invention to rubber goods of any description.

Figure 1:
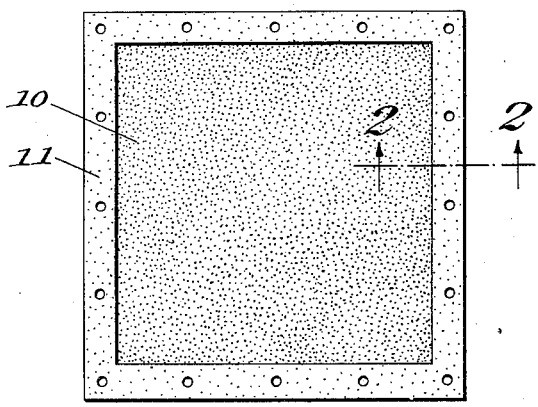
Figure 2:
Figure 3:
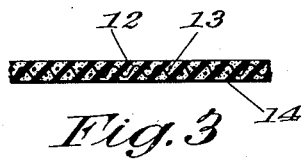
Figure 5:
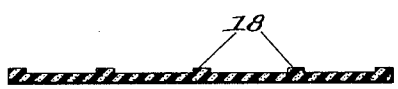
Figure 4:
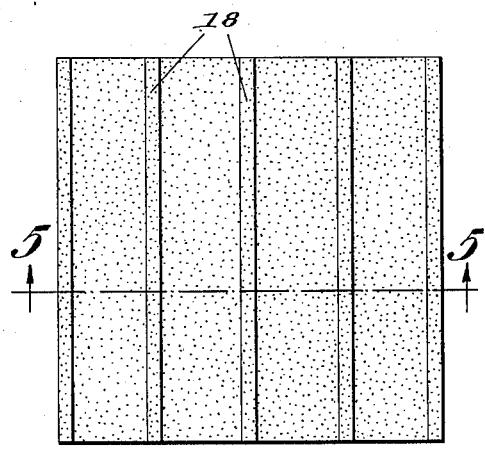
Figure 6:
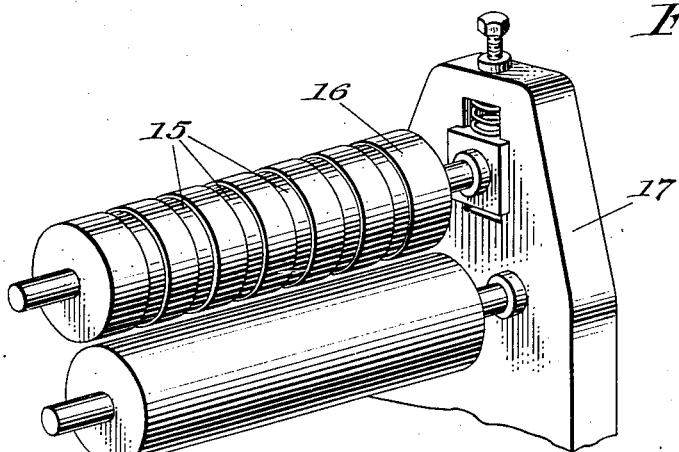

In addition to the objects set forth above, other objects will become apparent from the specification and from the drawing in which Fig. 1 illustrates my invention when made up into the form of a filter membrane. Fig. 2 is a cross section of Fig. 1 on the line 2—2. Fig. 3 is a cross section through a modified form of the filter membrane which bears a metallic reinforcement. Fig. 4 shows a battery separator made in accordance with my invention. Fig. 5 is a cross section through Fig. 4 on the line 5—5 and Fig. 6 shows an arrangement of rolls suitable for forming battery separators.

For many years attempts have been made to produce battery separators and filtration membranes from porous rubber, but, the various proposals of which I am aware introduce serious process difficulties or are expensive. As an example of the difficulties encountered, many years ago, it was proposed to make a porous rubber cell for primary batteries by adding salt to the rubber while it was on the mill, and subsequent to curing, leaching out the salt by prolonged boiling.

When one attempts to make cells by such a process, however, it will be found that it is impossible to control the degree of porosity or the size of pores which will be formed. As a result, the electrical characteristics of such cells vary widely. For this reason, there has never, so far as I am aware, been any extensive use of the process.

In the course of my investigation of such products, I reached the conclusion that the use of frangible substances such as salt or sugar will, necessarily lead to erratic results, for the grains are ground and broken up upon the rubber mill in an unpredictable manner as the compound is being prepared.

In a porous membrane, it is an obvious essential that the average pore size shall remain uniform, otherwise the filtering and electrical characteristics of the membrane will be largely uncontrolled. But, if the particles are broken up on the mill in varying and unpredictable degrees, this cannot occur.

Although I believe that substances which are essentially crystaline in nature are unsuitable, many noncrystalline substances are equally unsuitable because they adhere so firmly to the rubber that their particles are literally torn apart as the compound is worked on the mill, or they become so wetted and coated with rubber that they are, just as are the fillers in hard rubber, permanently incorporated in the mass.

I have found that certain substances may be added to rubber while it is on the mill which are not reduced or broken by the action of the rolls, which do not become coated or embedded in an impenetrable matrix of rubber and which may be almost entirely removed from the rubber after the compound has been cured. Thus a porous rubber article having electrical and mechanical characteristics which may be depended upon may be produced.

Generally speaking, after a normal rubber compound has had sufficient working to follow the mill rolls properly, I add, as a volume loading substance, materials not subject to any substantial degree of attrition under the action of the milling rolls.

For this purpose, starch is very satisfactory. Its particles do not appear to suffer attrition as the rubber is worked in the mill, possibly because its adhesion to rubber is so poor that the rubber apparently slides over the starch granules without disrupting them even though the compound is severely worked.

The amount is not critical—more starch makes a more porous product—but, there is an upper limit, depending upon the particular rubber and the plasticizer used, beyond which the mass becomes dry and crumbly and cannot be worked on the mill. Starch from different vegetable sources varies in size, a fact which provides a second means of controlling porosity, but, usually, starch granules produced from any given source and by any given method of manufacture are remarkably uniform in size and will produce products of remarkably uniform porosity.

After milling, the compound is formed and is cured. The starch in the cured rubber can be removed by boiling water alone, but the conversion and leaching out in this manner is a tedious process, nor is the starch ever completely or uniformly removed. I have found, however, that 98% of the dry weight of the starch originally added will be removed by soaking the articles in a solution of an enzyme capable of converting starch directly into a soluble product. The common commercial diastases will be found very effective if the rubber mass after cure is soaked in a ½ to a 1% solution of diastase having an adjusted pH of 5.5 to 6.5 for four or five hours at 30–40° C.

Although I prefer to use starch because of low cost and manufacturing simplicity, alternatively, other substances which resist attrition on milling with rubber may be used, for example, the dried reaction product of lime and casein, dried meat fibrin, albumin, etc. The milling and curing procedure, when these substances are used, is carried on exactly as in the case of starch; the albumin and meat fibrin may be removed in baths of proteolytic enzymes such as trypsyn or pepsin, while the lime-casein may be leached out by boiling the rubber mass in a solution of sodium hexametaphosphate and pyrophosphate, such as is set forth in U. S. Patent No. Re. 19,719.

As a specific example of my invention:

*Example 1*

| | Parts of |
|---|---|
| Plantation smoked sheets | 300 |
| Sulphur | 120 |
| Zinc oxide | 10 |
| Mercaptobenzothiazol | 3 |
| Cornstarch | 700 | are worked on a rubber mill until thorough mixing is secured.

The material is then passed through a calender and sheeted to the thickness desired, but, since porous hard rubber is quite fragile, I find it advantageous in producing filtration media to place, as I show in Figs. 1 and 2, a frame 11 of soft rubber around the filter sheet 10 before the vulcanization either of the frame or of the porous portion. The frame 11 and the filter 10 are vulcanized together. The rubber compound in the frame should, preferably, have low sulphur content and be compounded so as to prevent overcuring in the conditions which are necessary to change the filter sheet to the ebonite stage. I find that the soft, resilient edge allows proper clamping in a filter press and effectively protects the porous portion from strains which later cause breakage.

The mould in which the filter sheet is formed is relieved so that no pressure is exerted upon the sheet 10 when it is closed. Instead, the gum stock is laid upon and covered by pads of muslin. The gum rubber of the clamping frame is preferably applied in strips to enfold the margins of the sheet 10, and the mould is designed so that during cure it will exert pressure in a normal manner upon the frame portion 11.

When the pressures encountered in the filter press are relatively high, it is necessary to reinforce the porous portion in some manner. As illustrated in Fig. 3, I prefer to do this by building up a sandwich comprising a layer of starch containing rubber 12, a metallic screen or a foraminous plate 13 and a second layer of starch containing rubber 14. The sandwich is calendered to drive the rubber completely through the meshes of the screen or the interstices of the plate and then the sheet is cured in the manner already described. Such a sheet will stand high pressures in a filter press without rupture.

Battery separators are made in the following manner:

I provide a series of parallel grooves 15—15 (Fig. 6) in one roll 16 of a calender 17, and by calendering the gum stock through such rolls, ribs 18 (Figs. 4 and 5) are formed thereon. The ribbed stock is cut into convenient lengths which are laid on wire screening and which are cured in tight containers to prevent any direct contact with steam. The curing conditions may be, for example, steam pressure 52 lbs.; time, four hours.

After curing, all articles are soaked in a ½% diastase solution at 35° C. for four hours to convert the starch volume loading, and are then boiled or washed in water for a short time to clear them of the water-soluble substances.

*Example 2*

100 parts of plantation sheet are worked in the mill as before and when the rubber follows the rolls properly, 3 parts of sulphur, 3½ parts of zinc oxide, 1½ parts of diphenylguanidine and 500 parts of cornstarch are added to the rubber. This material produces soft, porous rubber and may be moulded according to conventional practices. It is then treated with diastase as before to remove the starch volume loading.

This soft, porous rubber has proved to be a most useful substance. It is much tougher and mechanically stronger than sponge rubber. Not only are its pores much smaller than in rubber sponge, but no "skin" is formed in moulding, which, in the case of conventional sponge rubber, must later be cut away. Thin sheets look and feel like suede leather.

Filter sheets may be made from this material by following the procedure I have outlined for the manufacture of ebonite sheets.

It follows that my invention is useful with heavy rubber, gutta percha, balata and natural rubber-like substances and is equally so with artificial rubber-like masses derived from polymerized chloroprene, butadiene and ethylene polysulphides. Accordingly, in the specification and the claims, I have used "rubber" in a broad sense and intend by it to cover rubber and rubber-like substances irrespective of their actual origin.

I claim:

1. The process for the formation of porous filter media which comprises milling a mass comprising rubber, curing substances and a volume loading substance comprising starch together, forming a filter-sheet from the mass, curing the sheet, converting the starch to a soluble product and leaching the product from the sheet.

2. The process for the formation of porous rubber which comprises milling a mass comprising rubber, curing substances and a volume loading substance comprising starch together, forming an article from the mass, curing the article, subjecting the starch to the action of an enzyme, thereby to convert the starch into a soluble product and leaching the product from the article.

3. The process for the formation of porous rubber which comprises milling a mass comprising rubber, curing substances and a volume loading of calcium caseinate together, forming a filter from the mass, curing the formed mass, converting the calcium caseinate to a soluble product and leaching the product from the cured mass.

4. The process for the formation of porous rubber which comprises milling a mass comprising rubber, curing substances and a proteinous volume loading substance together, forming an article from the mass, curing the article, subjecting the volume loading substance to the action of a proteolytic enzyme, and leaching the decomposition products of the substance from the article.

5. A process for the manufacture of porous rubber with pores of controlled size which comprises milling grains of a non-leachable substance into a rubber mix, maintaining substantially the size and shape of the grains while vulcanizing the rubber, converting the grains into a soluble substance and leaching the substance out of rubber.

6. The method of producing uniform porosity in vulcanized rubber which consists in incorporating grains of a non-leachable substance in rubber before vulcanization, vulcanizing the mass under conditions which substantially prevent the swelling of the grains, converting the grains into a soluble substance and leaching the substance out of the rubber.

7. A method of producing a uniform porosity in vulcanized rubber which consists in incorporating starch grains in the rubber before vulcanization, vulcanizing the mix sufficiently to set the rubber matrix without swelling the starch grains and removing them after vulcanization.

8. A rubber article produced by the process of claim 5.

9. A rubber article produced by the method of claim 6.

10. A rubber article produced by the method of claim 7.

ERNST A. HAUSER.